United States Patent
Sata et al.

(10) Patent No.: US 7,463,312 B2
(45) Date of Patent: Dec. 9, 2008

(54) REMOTE CONTROLLER AND TRANSMITTER-RECEIVER USING THE SAME

(75) Inventors: Norifumi Sata, Takarazuka (JP);
Tamotsu Yamamoto, Ashiya (JP)

(73) Assignee: Panasonic Corporation, Osaka (JP)

( * ) Notice: Subject to any disclaimer, the term of this patent is extended or adjusted under 35 U.S.C. 154(b) by 544 days.

(21) Appl. No.: 11/152,129

(22) Filed: Jun. 14, 2005

(65) Prior Publication Data

US 2006/0017857 A1      Jan. 26, 2006

(30) Foreign Application Priority Data

Jul. 21, 2004   (JP) ............... 2004-212723

(51) Int. Cl.
    *H04N 5/44*     (2006.01)
(52) U.S. Cl. .................................... 348/734
(58) Field of Classification Search ............... 348/734, 348/725; 340/825.72, 825.69; 341/176; 386/46; *H04N 5/44*
    See application file for complete search history.

(56) References Cited

U.S. PATENT DOCUMENTS

| 6,425,129 | B1 | 7/2002 | Sciammarella et al. |
| 6,686,911 | B1 | 2/2004 | Levin et al. |
| 6,819,864 | B2 * | 11/2004 | Fujita et al. ............... 348/734 |
| 2005/0030434 | A1 | 2/2005 | Sata et al. |

FOREIGN PATENT DOCUMENTS

| EP | 1 533 825 A1 | 5/2005 |
| EP | 1 617 446 A1 | 1/2006 |
| JP | 62154352 A * | 7/1987 |
| JP | 62157352 A * | 7/1987 |
| JP | 11351898 A * | 12/1999 |
| JP | 2001-320789 A | 11/2001 |
| WO | WO 2004/029896 | 4/2004 |

OTHER PUBLICATIONS

French Search Report for FR 0506414, dated Feb. 7, 2006.
British Search Report for GB0511261.0, dated Sep. 30, 2005.

* cited by examiner

*Primary Examiner*—Sherrie Hsia
(74) *Attorney, Agent, or Firm*—RatnerPrestia

(57) ABSTRACT

Provided is a remote controller in which a ring-shaped operating part is structured rotatable and capable of making rocking motion by pressing, a first remote-control signal responsive to rotation of the operating part allows sound volume adjustment, a second remote-control signal responsive to a switch signal supplied by pressing the operating part changes the function to channel selection, a third remote-control signal responsive to rotation of the operating part within a predetermined period of time allows channel selection. This structure can reduce the number of separate operating keys and allows a simple successive operation of the operating part to control a receiver.

9 Claims, 5 Drawing Sheets

REMOTE CONTROLLER AND TRANSMITTER-RECEIVER USING THE SAME

BACKGROUND OF THE INVENTION

1. Field of the Invention

The present invention relates to a remote controller used for remote-controlling various kinds of electronic equipment, such as a television (TV) set, video cassette recorder (VCR), and air-conditioner, and a transmitter-receiver using the remote controller.

2. Background Art

In the recent progress in functions and diversification of various kinds of electronic equipment, such as a TV set, VCR and air-conditioner, required as a remote controller for remote-controlling such equipment is one capable of performing complicated and various operations with a simple operation.

Against such a background, especially in TV broadcasting, terrestrial digital broadcasting, broadcasting satellite (BS) broadcasting, and communication satellite (CS) broadcasting are also available in addition to the conventional terrestrial analog broadcasting. Accordingly, equipment for supporting such broadcasting is increasing. A conventional remote controller for supporting the equipment is described with reference to FIG. 5.

FIG. 5 is a perspective view showing an appearance of a conventional remote controller. With reference to FIG. 5, the top portions of operating keys made of insulating resin or rubber protrude from the top face of insulating-resin housing 1 vertically movable.

In a rear position from the center of the top face of housing 1, 12 operating keys are arrayed in four rows and three columns to form ten key part 2. Additionally, in substantially the center of the top face of housing 1, channel selecting key 3A and sound volume adjusting key 3B are disposed in juxtaposition. Each of these keys is structured capable of making a longitudinal rocking motion.

Further, between the portion in which channel selecting key 3A and sound volume adjusting key 3B are disposed in juxtaposition and ten key part 2, four broadcasting selecting keys 5 for selecting the kind of broadcasting to receive are arrayed laterally in a row. The description of other operating keys is omitted.

In housing 1, a wiring board (not shown) having a plurality of conductive patterns formed on the top and bottom faces thereof is housed. Formed on this wiring board is a plurality of switch contacts (not shown) to be brought into electrical contact with each other by the pressing operation of each operating key constituting ten key part 2 and the like.

Further on the wiring board, a controlling part (not shown) including a microcomputer connected to the plurality of switch contacts is disposed. The controlling part detects a signal supplied according to the contact state of the switch contacts. Then, responsive to the detection of the signal, a predetermined remote-control signal is transmitted from transmitting part 6 formed of a light-emitting diode (LED), and other components mounted on the wiring board.

Thus, in the conventional remote controller, pressing each operating key in ten key part 2 or rocking channel selection key 3A or sound volume adjusting key 3B by pressing operation toward corresponding electronic equipment, such as a TV set and VCR, brings the switch contacts under the operating key into electrical contact with each other. Then, the controlling part detects the state of pressed operating key, and transmitting part 6 transmits an infrared remote-control signal corresponding to the detection result to the electronic equipment. The remote-control signal is received by a receiving part (not shown) of the equipment so that the channel is selected or sound volume is adjusted in the electronic equipment.

Further, the terrestrial analog broadcasting, terrestrial digital broadcasting, BS broadcasting, or CS broadcasting is selected by pressing a desired one of broadcasting selecting keys 5 corresponding and allocated to the kinds of broadcasting. Then, display on a display part (not shown), such as cathode-ray tubes and liquid crystal display devices, of the electronic equipment shows that the desired broadcasting is selected.

As a prior art technical reference information, Japanese Patent Unexamined Publication No. 2001-320789 is known, for example.

However, in the conventional remote controller, it cannot help that a large number of operating keys corresponding to various functions are disposed to remote-control electronic equipment having a higher level of functions and diversification. For this reason, necessity of a large number of switch contacts corresponding to the operating keys increases the number of components and complication in operation.

SUMMARY OF THE INVENTION

The present invention addresses these conventional problems and aims to provide a remote controller having a reduced number of operating keys and capable of selecting various functions with a simple operation and a transmitter-receiver using the remote controller.

The remote controller of the present invention includes (i) a rotatable ring-shaped operating part, (ii) a rotation detecting switch for detecting the rotation state of the operating part, (iii) a switch provided under the operating part, (iv) a transmitting part for transmitting a remote-control signal, and (v) a controlling part for controlling the transmitting part responsive to a first signal generated from the rotation detecting switch by rotating the operating part, or a second signal generated from the pressed switch by tilting the operating part. The controlling part causes the transmitting part to transmit a first remote-control signal when detecting the first signal, and to transmit a second remote-control signal when detecting the second signal.

This structure allows a simple successive operation, rotation or pressing, of one operating part to transmit each remote-control signal for remote-controlling equipment in use. Thus, the number of operating keys in the remote controller can be reduced and its operability can be improved.

DETAILED DESCRIPTION OF THE INVENTION

An exemplary embodiment of the present invention is described hereinafter with reference to FIGS. 1 to 4.

EMBODIMENT

Figure 1:
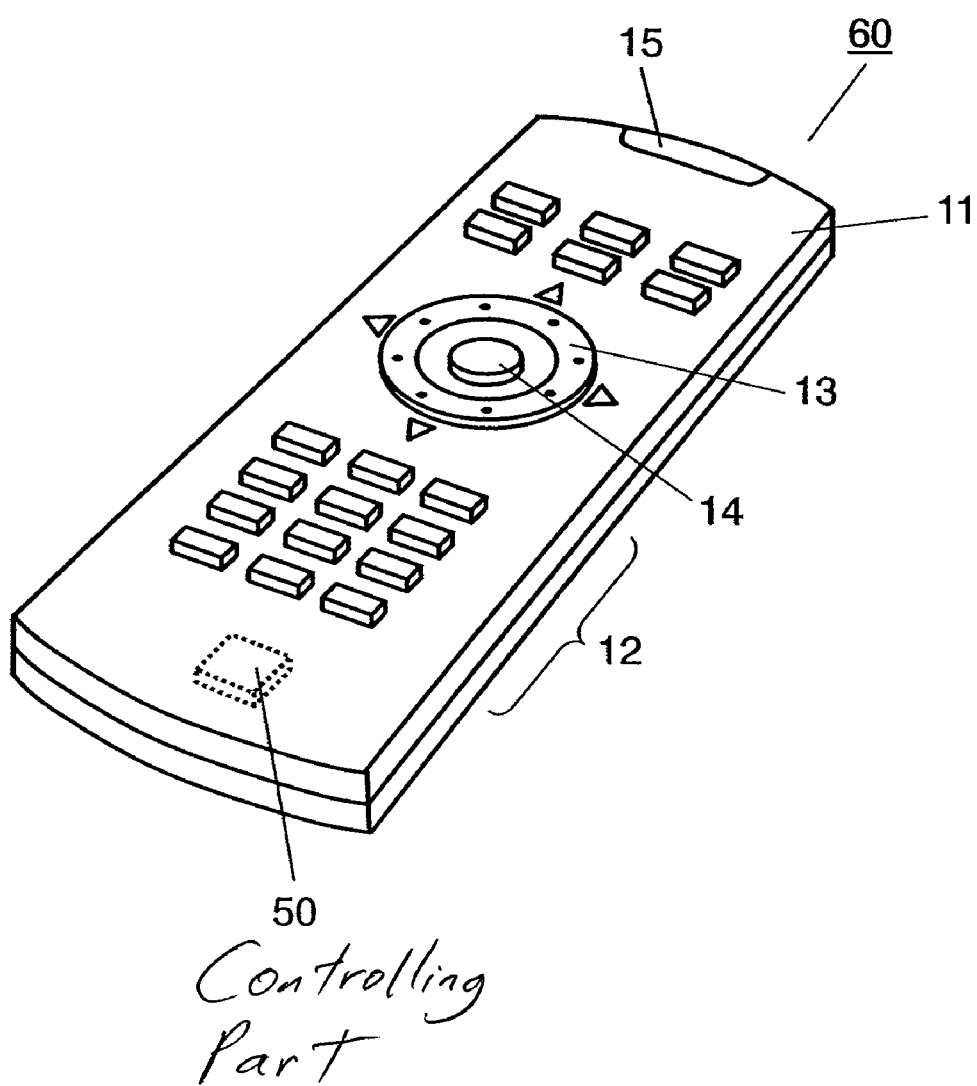
FIG. 1 is a perspective view showing an appearance of a remote controller in accordance with an exemplary embodiment of the present invention.
Figure 2:
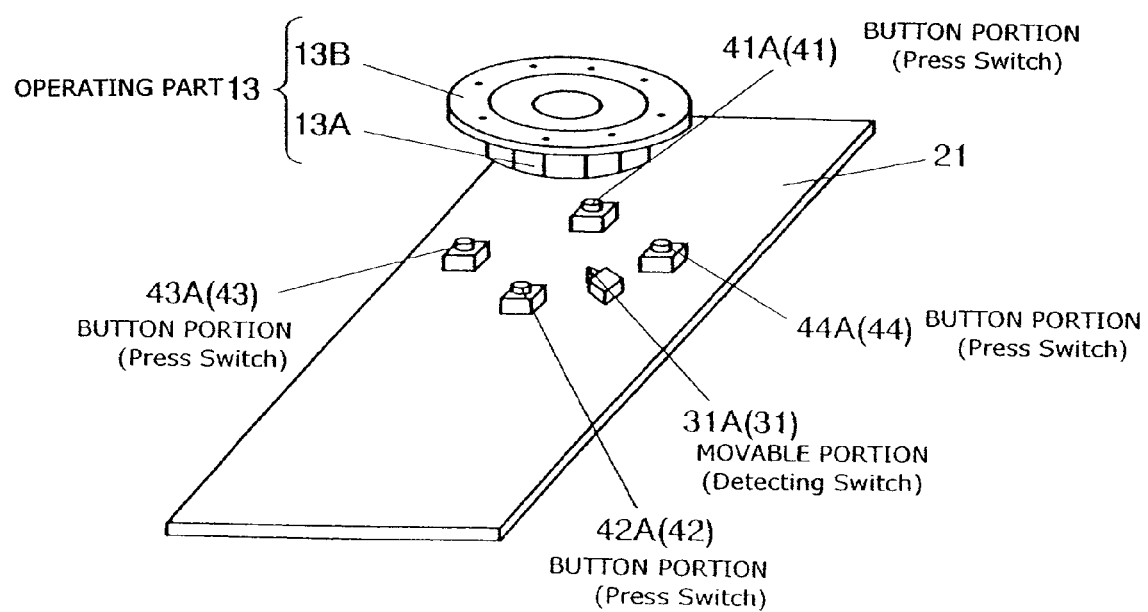
FIG. 2 is an exploded perspective view schematically showing a structure of an operating part, an essential part of the remote controller in accordance with the exemplary embodiment.
Figure 3:
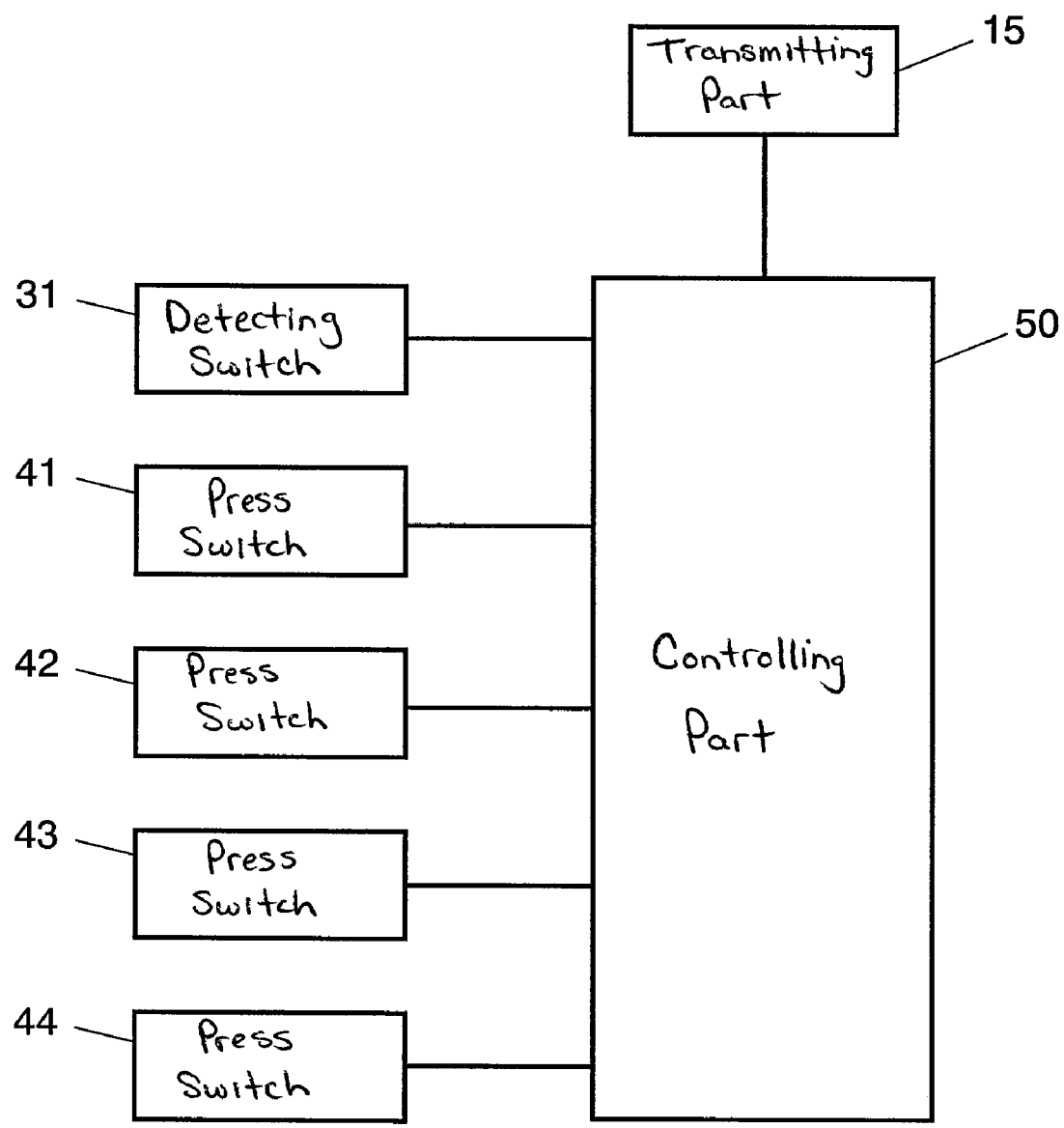
FIG. 3 is a block diagram of the remote controller in accordance with the exemplary embodiment.

FIG. 1 is a perspective view showing an appearance of a remote controller in accordance with an exemplary embodiment of the present invention. FIG. 2 is an exploded perspective view schematically showing a structure of an operating part, an essential part of the remote controller in accordance with the exemplary embodiment. FIG. 3 is a block diagram of the remote controller in accordance with the exemplary embodiment.

As shown in FIG. 1, in remote controller 60 of this embodiment, the top portions of operating keys made of insulating resin or rubber protrude from the top face of insulating-resin housing 11 vertically movable. On the rear portion of the top face of housing 11, 12 operating keys are arrayed in four rows and three columns to form ten key part 12. Additionally, a plurality of operating keys is disposed on the front portion of the top face of housing 11.

Additionally, in the center of housing 11, ring-shaped operating part 13 made of insulating resin is disposed. This operating part 13 is rotatable with respect to housing 11, and capable of making rocking motion in lateral and longitudinal four directions of housing 11. With reference to FIG. 2, operating part 13 is structured of lower cylindrical portion 13A and wide ring portion 13B integrally formed on lower cylindrical portion 13A. The outer peripheral surface of lower cylindrical portion 13A is shaped like a gear having a predetermined pitch.

Wiring board 21 housed in housing 11 has a plurality of conductive patterns (not shown) formed on the top and bottom faces thereof. Detecting switch 31 for detecting the rotation of operating part 13 is mounted on this wiring board 21.

When operating part 13 is operated, movable portion 31A shaped like a triangular pole projecting from detecting switch 31 in horizontal direction of the board surface rotates in both directions of the tilted surfaces of the triangular pole of movable portion 31A according to the rotation of lower cylindrical portion 13A, generating switching signals (first signals). When operating part 13 is not operated, movable portion 31A automatically returns to the original neutral position. At this time, switching signals are not generated.

To realize these operations, detecting switch 31 is disposed so that movable portion 13A is engaged with the outer peripheral surface of lower cylindrical portion 13A of operating part 13 shaped like a gear. This structure can inexpensively achieve a mechanism in which a switching signal (first signal) from detecting switch 31 allows detection of the direction and amount of rotation of operating part 13. As the mechanism for detecting the direction and amount of rotation of operating part 13, another structure using a rotary encoder can also be used.

Further mounted on wiring board 21 in positions equidistant from the rotation center of operating part 13 at 90° are self-restoring press switches 41 to 44 each pressed by operating part 13 when operating part 13 rocks one of lateral and longitudinal four directions.

Button portions 41A to 44A of respective these press switches 41 to 44 protrude upward. The top end faces of these button portions 41A to 44A face to the flat bottom face of wide ring portion 13B integrally formed on lower cylindrical portion 13A with a predetermined clearance kept therebetween. The top face of this wide ring portion 13B is exposed from the top face of housing 11, forming the operating portion of operating part 13.

In a central hole of operating part 13, pressing body 14 made of insulating resin as shown FIG. 1 is disposed vertically movable. A central switch (not shown) mounted on wiring board 21 is operated by pressing pressing-body 14.

Though not shown, a plurality of switch contacts to be brought into electrical contact with each other by pressing each operating key in ten key part 12 and the like is formed on the top face of wiring board 21. Further on wiring board 21, electronic components, such as a microcomputer and LED, are mounted. Thus, controlling part 50 for performing predetermined processing and transmitting part 15 for transmitting remote-control signals are formed using these mounted components.

As shown in FIG. 3, these detecting switch 31 and four press switches 41 to 44 are connected to controlling part 50 independently. Transmitting part 15 is also connected to controlling part 50. Further, other switch contacts are connected to controlling part 50. However, detailed description using figures is omitted. Responsive to a signal from each of the switches, controlling part 50 controls a remote-control signal to be supplied from transmitting part 15.

Figure 4:
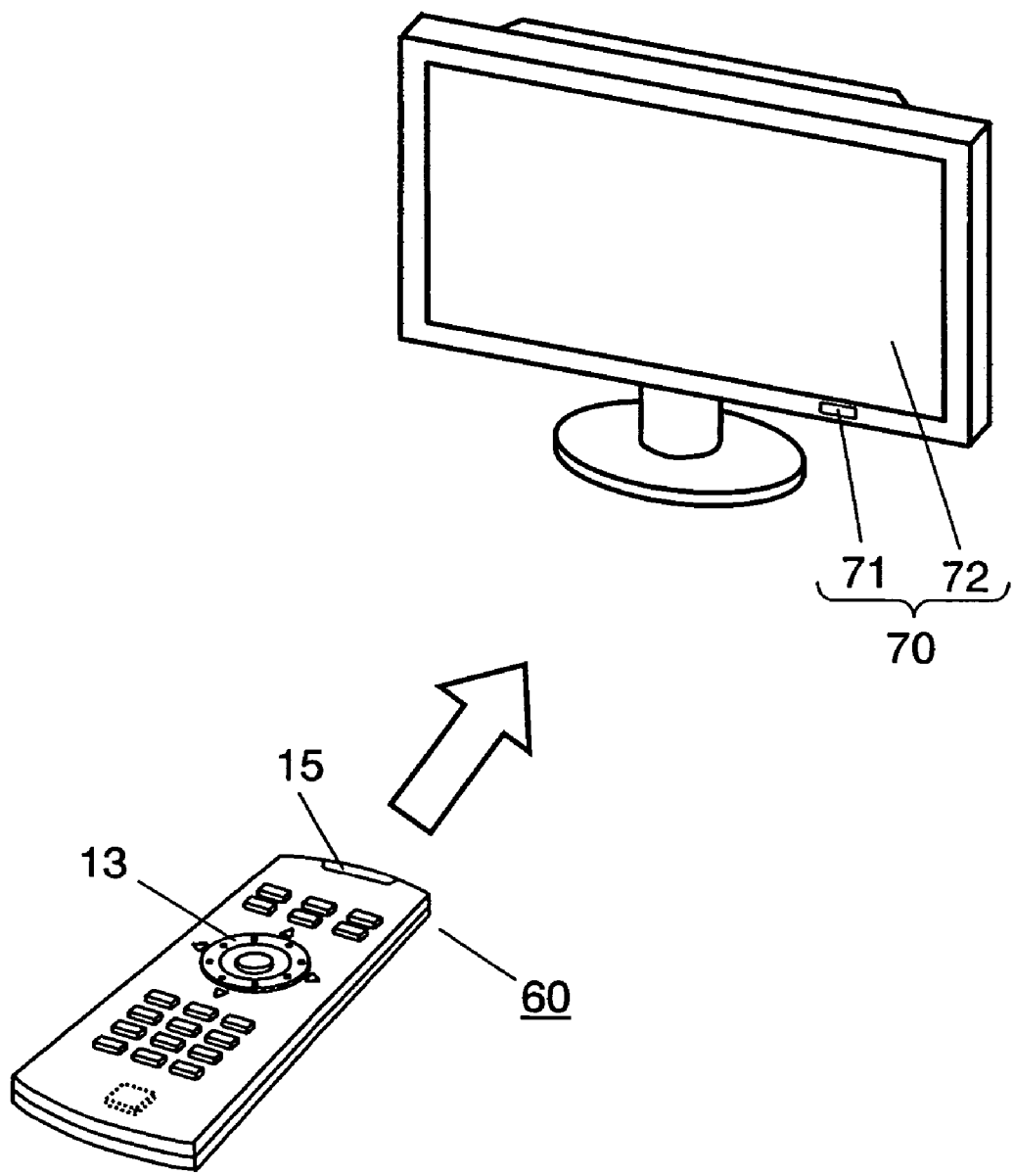
FIG. 4 is a perspective view of a television set using the remote controller, a transmitter-receiver in accordance with an exemplary embodiment.
Figure 5:
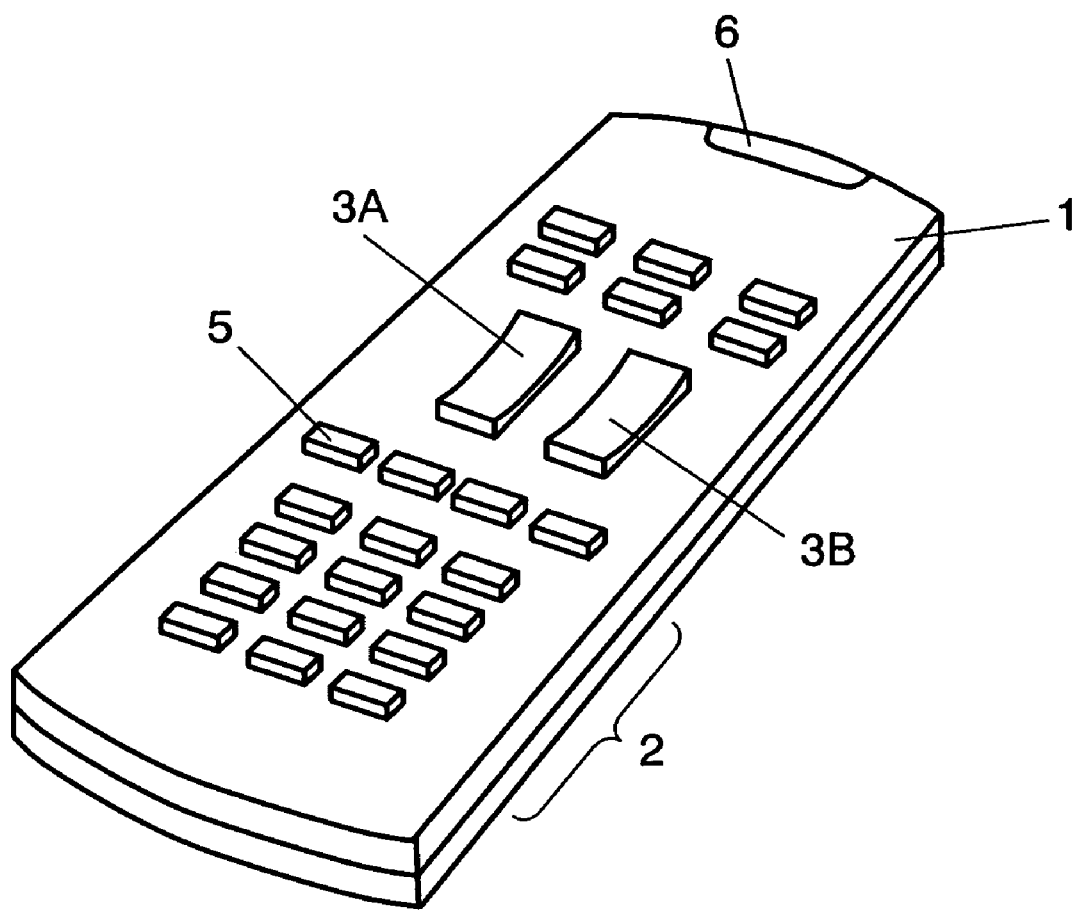
FIG. 5 is a perspective view showing an appearance of a conventional remote controller.

FIG. 4 is a perspective view of a TV set using the remote controller, a transmitter-receiver in accordance with an exemplary embodiment of the present invention. As shown in FIG. 4, remote controller 60 of the above structure constitutes a transmitter-receiver together with receiver 70, such as a TV set, incorporating receiving part 71 and display part 72, such as cathode-ray tubes and liquid crystal display devices.

Next, description is provided of the operation of remote controller 60 of the above structure and a transmitter-receiver using the remote controller. Now, receiver 70 is a TV set capable of receiving four kinds of TV broadcasting, i.e. terrestrial analog broadcasting, terrestrial digital broadcasting, BS broadcasting, and CS broadcasting.

First, an operating key corresponding to the power key in remote controller 60 is operated to power on the TV set, i.e. receiver 70.

When operating part 13 of remote controller 60 is rotated in the initial state in which receiver 70 is powered on, as described above, movable portion 31A of detecting switch 31 is filliped according to the rotation of the outer peripheral surface of lower cylindrical portion 13A formed like a gear. At this time, detecting switch 31 generates a switching signal (first signal) in which on-state signals and off-state signals are repeated alternately. This switching signal is fed into controlling part 50. Responsive to this switching signal, controlling part 50 causes transmitting part 15 to transmit a first remote-control signal. Now, the on-state signal means a signal generated when movable portion 31A of detecting switch 31 is in contact with the outer peripheral surface of lower cylindrical portion 13A. The off-state signal means a signal generated when movable portion 31A of detecting switch 31 is not in contact with the outer peripheral surface of lower cylindrical portion 13A.

Receiver 70 receives the first remote-control signal at its receiving part 71 and takes control according to the first remote-control signal. For example, when the first remote-control signal is allocated to a sound volume adjusting function having a high frequency of use, a simple operation of continuous rotation of operating part 13 can adjust the receiver to desired sound volume.

On the other hand, ring-shaped operating part 13 of this remote controller 60 is pressed downward in one of lateral and longitudinal positions of operating part 13 toward housing 11. Then, the operated position of operating part 13 rocks downward, and the flat bottom face of wide ring portion 13B going downward presses the corresponding one of button portions 41A to 44A of press switches 41 to 44. A button signal (second signal) generated by pressing is fed into controlling part 50. Responsive to the button signal, controlling part 50 causes transmitting part 15 to transmit a second remote-control signal.

According to the second remote-control signal corresponding to the rocking operation of operating part 13, receiver 70 selects one of the four TV broadcasting, i.e. terrestrial analog broadcasting, terrestrial digital broadcasting, BS broadcasting, and CS broadcasting. For example, when controlling part 50 detects a button signal from press switch 41 disposed in the front position, receiver 70 receiving the second remote-control signal selects reception of the terrestrial analog broadcasting and displays its reception in display part 72. Similarly, receiver 70 selects the terrestrial digital broadcasting for press switch 42 in the rear position, the BS broadcasting for press switch 43 in the left position, and the CS broadcasting for press switch 44 in the right position. Then, the reception of corresponding broadcasting is displayed in display part 72.

At this time, if marks for pressing operation, such as arrows, are disposed on the top face of housing 11 around operating part 13 corresponding to the positions of switches 41 to 44, press switches 41 to 44 can be operated without fail.

When operating part 13 is rotated after a predetermined period of time after desired broadcasting is selected by the operation, remote controller 60 transmits a first remote-control signal again, as described above. At this time, the first remote-control signal has a function of adjusting sound volume similar to the above description.

In contrast, when operating part 13 is rotated before the predetermined period of time elapses, controlling part 50 takes control so that transmitting part 15 transmits a third remote-control signal different from the first remote-control signal.

This third remote-control signal is for selecting a channel of the selected broadcasting. In other words, a rotating operation successively after pressing operating part 13 changes the channel of receiver 70 in increasing order or decreasing order of number depending on the direction of the rotating operation, and changes the display screen. When, no operation of operating part 13 lasts for a predetermined period of time after the channel selection, controlling part 50 takes control so that an original first remote-control signal is transmitted according to rotating operation of operating part 13. In this case, similar to the above description, the first remote-control signal is for adjusting sound volume.

Incidentally, the remote controller can also be structured so that when a channel is selected by a third remote-control signal, the predetermined period of time can forcedly be cancelled using a button signal (second signal) obtained by pressing operating part 13 in one of lateral and longitudinal four directions again. Alternatively, this forced cancellation can be performed by operation of another key. However, when pressing operating part 13 as described above or pressing pressing-body 14 positioned in proximity to operating part 13 can forcedly cancel the time, the amount of movement of the fingers and thus complication of operation can be reduced.

Alternatively, a channel can be selected by another method: displaying respective channels as icons using a second remote-control signal, showing a selected channel using a cursor, and changing the cursor position according to the direction of rotation using a third remote-control signal.

Alternatively, the present invention can be structured so that receiver 70 detects whether or not to receive a first remote-control signal within a predetermined period of time after reception of a second remote-control signal, and a third remote-control signal from remote controller 60 is eliminated.

In this manner, a remote-control operation in which one ring-shaped operating part 13 is rotated and pressed successively in a predetermined order can take control of equipment capable of selecting broadcasting or a channel and adjusting sound volume. Additionally, dedicated operating keys are not necessary and thus the number of operating keys can be reduced. Further, because the remote-control operation can successively be performed with the fingers placed on operating part 13, excellent operability can be achieved.

Further, a receiver-transmitter using remote controller 60 in which a successive operation of operating part 13 can remote-control the receiver in various kinds of operation modes can easily be achieved.

As described above, a first remote-control signal supplied by rotating operating part 13 is allocated to a function having a high frequency of use, a second remote-control signal supplied by pressing operating part 13 is allocated to a signal for changing to another function having a high frequency of use, and a third remote-control signal supplied by rotating operating part 13 allows selection of items of the changed function. Thus, a user-friendly remote controller can easily be achieved.

Now, a first remote-control supplied by rotating operating part 13 can be used for channel selection. A second remote-control signal supplied by pressing operating part 13 can be used for a signal changing to a sound volume function. A third remote-control signal obtained again within a predetermined period of time can be used for sound volume adjustment. The signals can be allocated to the functions as desired.

As described above, for a remote controller and a receiver-transmitter using the remote controller of the present invention, a simple successive operation, such as rotation and pressing, of one operating part takes various kinds of control of equipment. Therefore, the present invention has advantages of reducing the number of operating keys and providing excellent operability. Thus, the present invention is useful for remote-controlling various kinds of electronic equipment, such as a TV set, VCR, and air-conditioner.

What is claimed is:

1. A remote controller comprising:
   a rotatable ring-shaped operating part having a bottom surface and a side surface which are both below a top surface of said operating part;
   a rotation detecting switch;
   a tilt detecting switch;
   rotation of said operating part is detected by detecting rotation of said side surface past the rotation detecting switch; and
   tilting of said operating part is detected by detecting tilting of said bottom surface towards said tilt detection switch.

2. A remote controller according to claim 1, further comprising:
   a transmitting part for transmitting a remote control signal, and
   a controlling part for controlling the transmitting part responsive to one of a first signal generated from the rotation detecting switch by rotating the operating part and a second signal generated from the tilt detecting switch by tilting the operating part,
   wherein, the controlling part causes the transmitting part to transmit a first remote-control signal when detecting the first signal, and causes the transmitting part to transmit a second remote-control signal when detecting the second signal.

3. The remote controller of claim 2, wherein the controlling part causes the transmitting part to transmit a third remote-control signal when detecting the first signal within a predetermined period of time after detection of the second signal.

4. The remote controller of claim 3, wherein, in the state where the transmitting part is to transmit the third remote-control signal, the controlling part causes the transmitting part to transmit the first remote-control signal when detecting the first signal within a predetermined period of time after detection of the second signal.

5. The remote controller of claim 3, wherein
the first remote-control signal is for adjusting sound volume; and
the third remote-control signal is for selecting a channel.

6. The remote controller of claim 3, wherein
the first remote-control signal is for selecting a channel; and
the third remote-control signal is for adjusting sound volume.

7. A remote controller according to claim 1, wherein said bottom surface is substantially parallel to said top surface.

8. A remote controller according to claim 1, wherein said side surface is orthogonal to said bottom surface.

9. A transmitter-receiver comprising:
a remote controller comprising:
a rotatable ring-shaped operating part having a bottom surface and a side surface which are both below a top surface of said operating part;
a rotation detecting switch;
a tilt detecting switch;
rotation of said operating part is detected by detecting rotation of said side surface past the rotation detecting switch;
tilting of said operating part is detected by detecting tilting of said bottom surface towards said tilt detection switch
;and
a receiver comprising:
a receiving part for receiving the remote-control signal; and
a display part for displaying predetermined information according to the remote-control signal received by the receiving part.

* * * * *